Jan. 12, 1943.    R. L. BEASECKER    2,307,985
CONTAINER FOR ASSEMBLIES TO BE BONDED
Filed Dec. 28, 1940
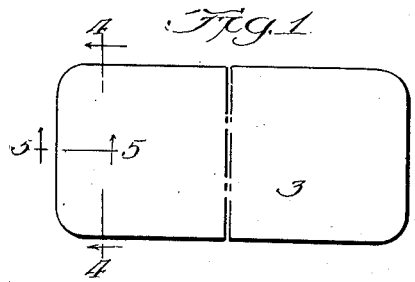
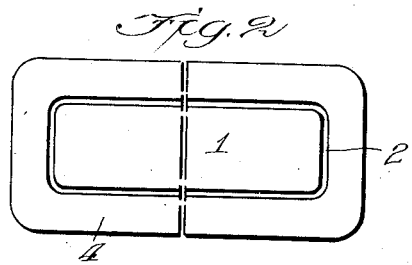
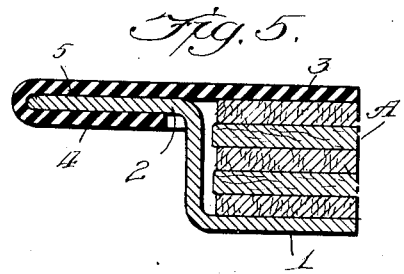
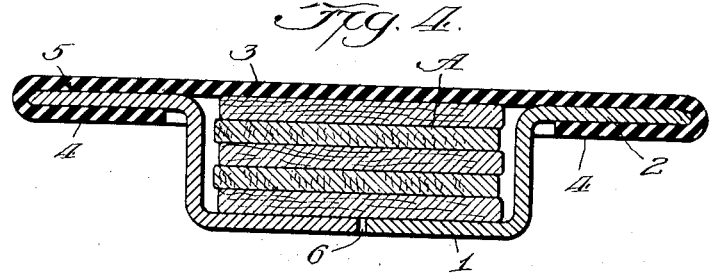
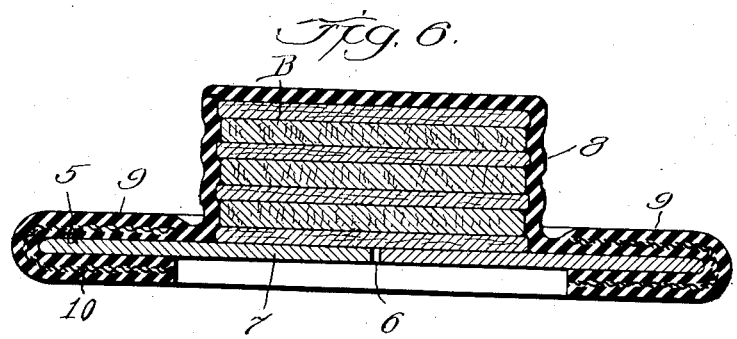
Inventor:
R. L. Beasecker,
by Wm F. Freudenreich,
Atty.

Patented Jan. 12, 1943

REISSUED
APR 24 1945

2,307,985

UNITED STATES PATENT OFFICE 2,307,985

CONTAINER FOR ASSEMBLIES TO BE BONDED

Raymond L. Beasecker, Grand Rapids, Mich.

Application December 28, 1940, Serial No. 372,065

4 Claims. (Cl. 144—281)

A common practice of bonding veneer assemblies to produce plywood, either in a flat, bent or molded form, is to lay an assembly upon a suitable die or support of the desired surface configuration and cover the assembly with a rubber blanket which must be fastened to the die or support to produce a sealed housing or container for the assembly. The package thus created is placed in a closed chamber in which is built up the requisite fluid pressure to accomplish the results desired; the pressure being accompanied by heating, where necessary, as, for example, by employing steam to provide both heat and pressure. Difficulty has heretofore been experienced in making the joints between the flexible rubber member and the steel or other stiff die member sufficiently tight to prevent transfer of fluid between the interior of the housing or container and the surrounding space. The common method of securing tight joints is to lay steel bars on the rubber member, along the margins of the latter, and to apply clamps which, acting on one side against the bars and on the other side against the under face of the die or support, press the rubber tightly against the die or support. This method not only requires the use of clamping bars and numerous clamps, but much time is consumed in opening and closing the work containers, very greatly reducing the amount of work that a single person can do.

The object of the present invention is to produce a simple and novel container or housing of the aforesaid type which requires no clamping bars or clamps to hold it closed and seal it but seals automatically when the fluid pressure of the surrounding medium is substantially greater than that within the container or housing.

It has heretofore been attempted to cause the atmospheric pressure to press the marginal portions of the rubber member into sealing relation with the die member upon connecting the space between the two to a vacuum producing means and thus do away with mechanical fastenings. This method has proved impracticable even when employing in the joints oils or sealing compositions that do not set and form bonds between the rubber members and the dies.

I have discovered that if the rubber member be constructed with a fairly deep endless groove or channel into which the die or work-support may be sprung and be a good fit, so that the part of the rubber immediately adjacent to the groove or channel constitutes a rim fitted upon the die or work support, a joint may be obtained which is initially sufficiently tight and which is not likely to be disturbed in the ordinary handling of the apparatus while putting it into the pressure chamber. Then, when a differential pressure between the interior and the exterior of the container is brought about, with the greater pressure on the outside, the joint simply becomes tighter and no objectionable leakage through the same in either direction can take place. It is therefore a simple matter to unite the two sections of a container so as to enclose a piece of work, and it is perhaps even a simpler operation to disconnect the two sections from each other. In addition to the advantages heretofore mentioned, there is a further advantage in that the damage to the rubber that is done under the old practice by the clamps and clamping bars is entirely avoided in my new construction.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figs. 1, 2 and 3 are respectively a top plan view, a bottom plan view, and a side view of a container or housing embodying the present invention, the same being shown in its closed condition, and the greater part between the ends thereof having been broken away; Fig. 4 is a section on line 4—4 of Fig. 1, but on a larger scale than that of Fig. 1; Fig. 5 is a section on line 5—5 of Fig. 1, on the same scale as Fig. 4; and Fig. 6 is a view similar to Fig. 4, showing a modification.

Referring to Figs. 1 to 5, I is a die or work support which is shown as being in the shape of a long, narrow, deep pan having a wide flange 2 surrounding the same at the top. The depth of the cavity within the member I is about that of a little stack A of veneers which are to be bonded together to produce a piece of plywood almost as long and as wide as the cavity and of a thickness about equal to the depth of the cavity. This particular shape of die is of no importance, the shape depending entirely upon the product which it is desired to make.

Cooperating with the die member is a cover 3 of flexible rubber preformed so that the body portion thereof has substantially the same length and width as the die. In addition, the member 3 may be said either to have a thickened marginal portion extending continuously around the same and provided with a deep channel or groove cut into the thickened marginal portion from the inner edge, or to be flanged over so as to provide a deep continuous groove between the flange and the overlying body portion. At any rate, the resulting construction is a flat body member, the marginal portions of which have been turned over on one side to form an endless flange 4 spaced apart from the body portion a distance about equal to the thickness of the flange 2 of the die. Thus there exists between the flange and the body portion of the rubber section of the device a deep groove or channel 5 into which the flanges on the die may be sprung. By properly proportioning the parts, the flanges or marginal portions of the die can be made such a snug fit in the grooves or channels of the cooperating rubber member that the seal is just as satisfactory as is the case where elaborate mechanical clamping devices are employed.

The container is provided with a suitable vent, indicated more or less conventionally at 6, whereby the interior of the container may be placed in communication with the atmosphere outside of the pressure chamber (not shown), in which the treatment of the work is effected. Furthermore, this vent may be utilized to produce a partial vacuum within the container to bring about a preliminary sealing of the joint.

In Fig. 6 there is illustrated an arrangement in which the die 7 is a flat plate, whereas the body member 8 of the flexible section of the container is pan-shaped and is provided with a continuous flange 9 extending around the rim of the same. This flange may be like the rubber elements engaging the flange 2 of the die member in the other form, or it may be made considerably thicker than the rest of the rubber member, as shown in Fig. 6, while still containing the deep channel or groove 5 into which the marginal portions of the die member fit; and it may be reenforced with fabric 10, or otherwise.

It will be seen that although in the arrangement shown in Figs. 1 to 5 the pressure is applied only at the top and to the bottom of the veneer assembly A, the veneer assembly B in Fig. 6 has pressure exerted against it on all sides when the container is subjected to pressure in the pressure chamber. In other words, with this last construction, the walls of the body portion of the rubber section, under external pressure, are pressed into intimate contact, as shown in Fig. 6, not only with the face of the upper ply, but also with the edge faces along the sides and the ends of the plies.

As heretofore stated, the forms of containers or housings illustrated are intended simply for the purpose of explaining the principles of my invention, since the structures as a whole and the individual sections may take such shapes as the needs of the work to be done requires, just as is true in the previous practice.

Upon placing a filled container in a pressure chamber and building up in the latter a fluid pressure in any suitable way, the effect is to cause the rubber to grip the margins of the die more strongly and thus bring about a tightening of the joint between the two sections; the greater the pressure, the tighter the joint. During this time the vent is, of course, connected to the atmosphere surrounding the pressure chamber.

A typical practice for bending and bonding a plywood assembly under heat and pressure is as follows. After a package has been completed by laying the assembly on the die and applying the cover, the vent is connected to a vacuum pump and about a twenty-seven inch vacuum is obtained. Hammer blows are then applied to the rubber blanket to jar the individual layers of veneer into their proper positions. The vent is then closed by means of a suitable valve, not shown, and disconnected from the vacuum line. If the vacuum now does not drop below about fifteen inches, the seal is regarded as a good one. The vent is then connected to the tank line of the vacuum apparatus and the package is inserted in the pressure chamber which is then filled with steam until the desired pressure is attained. After the pressure against the exterior of the package has been built up, the vent is disconnected from the vacuum line and is placed in communication with atmosphere outside of the pressure tank. Some minutes before the steam is shut off, the vent is again connected to the vacuum line so as to insure against the formation of steam pockets in the space in which the work is confined and the consequent rupturing of the rubber upon shutting off the steam. The steam is then shut off, the vacuum broken, and the package removed from the pressure chamber. The container or housing is then opened and the bonded product removed, whereupon it is ready to receive another assembly, so that the process just described may be repeated.

Therefore, while I have illustrated and described with particularity only two simple forms of an apparatus embodying the present invention, I do not desire to be limited to the exact structural details thus illustrated and described; but intend to cover all forms and arrangements which come within the definitions of my invention constituting the appended claims.

I claim:

1. The method of sealing an assembly for a multiple-ply structure in a container and effecting bonding under heat and pressure which consists in inserting the assembly between a supporting member and a rubbery cover having a portion extending continuously around the supporting member and gripping the latter, producing a partial vacuum in the space between the supporting member and the cover, enveloping the package in heated fluid under pressure, venting the aforesaid space to atmosphere, then creating a partial vacuum in said space and, finally, removing the package from the influence of the heated fluid.

2. A two-piece separable container for a piece of work to be subjected to the pressure of a fluid medium surrounding and in contact with the container, which container is to be sealed by said pressure, consisting of a stiff supporting member for the work having a marginal portion extending continuously around the same, and a flexible rubbery cover member of a size to overlie a piece of work on said supporting member and rest on said marginal portion of the latter, said cover member having an inturned wide flange around its periphery defining an opening of smaller dimensions than said supporting member whereby said flange extends inwardly past the edges of said supporting member and overlies and engages said marginal portion when the cover is sprung in place on the supporting member to enclose the work, that portion of the cover forming the marginal portion thereof at the base of the flange being sufficiently thin to enable the pressure of said medium to force the material of the cover firmly against both sides of the marginal portion of the supporting member and to enable removal of said cover member from said supporting member when the pressure is relieved.

3. A two-piece separable container for a piece of work to be subjected to the pressure of the fluid medium surrounding and in contact with the container, which is to be sealed by said pressure, consisting of a stiff sheet metal supporting member for the work and a preformed, flexible rubbery cover member forming with the supporting member a housing for the work, said cover member being provided with an inturned flange around its periphery defining an opening of smaller dimensions than said supporting member and forming a deep, endless groove between said cover member and said flange into which the marginal portions of the supporting member are inserted to effect the closing of the container about the work, said flange being sufficiently flexible to permit said supporting member to be inserted in and removed from said cover member, through said opening.

4. A device constituting the cover section of a separable two-section container for a piece of work to be subjected to the pressure of a fluid surrounding the container, consisting of a flexible rubbery member provided with a marginal portion formed of two layers of rubbery material joined at their outer edges to form a deep continuous groove, the inner edges of one of said layers defining an opening through which the cooperating section is inserted to dispose its edges in said groove and through which said cooperating section can be removed, said marginal portion being thin enough to yield under the aforesaid pressure and cause said layers on opposite sides of the groove to be pressed into sealing engagement with the edges of said cooperating section.

RAYMOND L. BEASECKER.